US011881330B2

(12) United States Patent
Broderick et al.

(10) Patent No.: US 11,881,330 B2
(45) Date of Patent: Jan. 23, 2024

(54) ELECTRICAL BUSHING AND METHODS OF PRODUCING AN ELECTRICAL BUSHING

(71) Applicant: HITACHI ENERGY LTD, Zürich (CH)

(72) Inventors: Samuel Broderick, Zürich (CH); Peter Sjoberg, Ludvika (SE); Jan Czyzewski, Cracow (PL)

(73) Assignee: Hitachi Energy Ltd, Zürich (CH)

( * ) Notice: Subject to any disclaimer, the term of this patent is extended or adjusted under 35 U.S.C. 154(b) by 135 days.

(21) Appl. No.: 17/486,975

(22) Filed: Sep. 28, 2021

(65) Prior Publication Data

US 2022/0102031 A1 Mar. 31, 2022

(30) Foreign Application Priority Data

Sep. 30, 2020 (EP) .................................... 20199361

(51) Int. Cl.

*H01B 17/12* (2006.01)
*H01B 17/06* (2006.01)
*H01B 17/30* (2006.01)
*H01B 19/00* (2006.01)

(52) U.S. Cl.

CPC ............. *H01B 17/12* (2013.01); *H01B 17/06* (2013.01); *H01B 17/303* (2013.01); *H01B 19/00* (2013.01)

(58) Field of Classification Search

CPC ...... H01B 17/12; H01B 17/06; H01B 17/303; H01B 19/00; H01B 17/00; H01B 17/30; H01B 17/301; H01B 17/56; H01B 17/5835; H01R 4/70; H01H 9/02; H01H 9/0264

USPC ..... 174/178, 152 R, 142, 138 R, 139, 138 F, 174/137 R, 14 BH, 31 R, 209; 16/2.1, 2.2

See application file for complete search history.

(56) References Cited

U.S. PATENT DOCUMENTS

| | | | | |
|---|---|---|---|---|
| 4,500,745 A * | 2/1985 | Miggins | H01B 17/34 174/31 R |
| 4,563,545 A * | 1/1986 | Dzomba | H01B 17/301 174/152 R |
| 6,515,232 B2 * | 2/2003 | Forster | H01B 17/265 174/152 R |

(Continued)

FOREIGN PATENT DOCUMENTS

| | | |
|---|---|---|
| CN | 106415740 A | 2/2017 |
| DE | 19844411 A1 | 4/2000 |

(Continued)

OTHER PUBLICATIONS

Extended European Search Report, EP20199361.5, dated Mar. 3, 2021, 8 pages.

(Continued)

*Primary Examiner* — Angel R Estrada

(74) *Attorney, Agent, or Firm* — Sage Patent Group

(57) ABSTRACT

An electrical bushing is specified, the bushing including a flange with a lower part and an upper part affixed to one another and further including a core surrounded by the flange, wherein the flange is affixed to the core by a locking compound disposed in a volume of a joint between the flange and the core, and wherein the volume of the joint further includes a compressible material, the compressible material being configured to compress or expand in response to a change in the volume of the joint.
Furthermore, a method of producing an electrical bushing is specified.

20 Claims, 3 Drawing Sheets

(56) References Cited

U.S. PATENT DOCUMENTS

| | | | | |
|---|---|---|---|---|
| 7,812,266 | B2 * | 10/2010 | Rocks | H01B 17/265<br>174/152 R |
| 8,492,656 | B2 * | 7/2013 | Martinez | H01B 17/265<br>174/152 R |
| 8,861,165 | B2 * | 10/2014 | Kampe | H01C 1/14<br>174/158 R |
| 9,947,442 | B2 | 4/2018 | Engelbert et al. | |
| 11,367,545 | B2 * | 6/2022 | Engels | H01G 4/35 |
| 2009/0288878 | A1 | 11/2009 | Rocks et al. | |

FOREIGN PATENT DOCUMENTS

| | | | |
|---|---|---|---|
| DE | 102016205535 | A1 | 10/2017 |
| EP | 0746002 | A2 | 12/1996 |
| EP | 1622173 | A1 | 2/2006 |
| EP | 3249786 | A1 | 11/2017 |
| EP | 3579252 | A1 | 12/2019 |
| KR | 101810407 | B1 | 12/2017 |
| WO | WO 2018/141775 | A1 | 8/2018 |

OTHER PUBLICATIONS

Office Action, Chinese Patent Application No. 2021106755166, dated May 9, 2023, 7 pages.

* cited by examiner

ELECTRICAL BUSHING AND METHODS OF PRODUCING AN ELECTRICAL BUSHING

CROSS REFERENCE TO RELATED APPLICATIONS

This application claims foreign priority to European Patent Application No. 20199361.5, filed on Sep. 30, 2020, the disclosure and content of which is incorporated by reference herein in its entirety.

BACKGROUND

The present embodiments relate to an electrical bushing. Electrical bushings are used to insulate and transduce electrical power through planes with different electrical potential, such as grounded transformer housings. The structure and dimensions of such bushings depend on the respective requirements, and most types of bushings are manufactured according to specific application needs and parameter ranges.

Condenser core bushings are a common variety of electrical bushings for medium to high voltage applications. In a condenser core bushing, a core comprising several layers of intermittent conductive layers and dielectric films is arranged around a central conductor, thereby controlling the distribution of the electric field by capacitive grading. One way to fixate the core and the flange of such bushings to each other is to use a locking compound as described in document EP 3 579 252 A1.

In some applications, the bushings may be subjected to large temperature changes during operation, particularly in outdoor applications. For example, in outdoor transformer applications the highest occurring temperature is related to the hot oil filling of the transformer and the lowest temperature corresponds to the ambient temperature if the transformer is not operating under high power load. Due to different coefficients of thermal expansion of the materials used for the bushing, repeated mechanical stress within the cured locking compound and at interfaces to the core and the flange may result in premature failure of the joint and hence the bushing.

SUMMARY

It is an object of the present embodiments to mitigate the effects of the relative thermal expansion of the core and the flange on the locking compound and on the core material.

This object is obtained, inter alia, by an electrical bushing and a method for producing an electrical bushing according to the independent claims. Developments and expediencies are subject of the further claims.

According to at least one embodiment of the electrical bushing, the electrical bushing comprises a flange with a lower part and an upper part affixed to one another and further comprises a core surrounded by the flange. The flange is affixed to the core by a locking compound disposed in a volume of a joint between the flange and the core. The volume of the joint further comprises a compressible material, the compressible material being configured to compress or expand in response to a change in the volume of the joint.

The terms "lower part of the flange" and "upper part of the flange" do not imply a limitation regarding the actual position of these elements in space. For instance, the lower part of the flange is that part that provides a mounting face for mounting the bushing to an electrical appliance, for instance a transformer housing, a switchgear or a reactor.

Thus, the joint comprises a portion of the volume of the joint that is filled with a compressible material. For example, the volume of the joint may change during operation of the bushing on account of different thermal expansion coefficients of materials for the flange and the core. For example, the compressive material may be arranged directly adjacent to the locking compound. For instance, the compressive material fills between 10% and 90% of the volume of the joint. The compressive material may be stable throughout the lifetime of the bushing, or it may fully or partially disintegrate or degrade after the locking compound has cured during production of the bushing.

The portion comprising the compressible material is provided in addition to the locking compound and has the advantage of higher temperature tolerance between high and low load cycles. This is an effect of the added volume held by the easily compressible material, which functions as an expansion joint when the thermal expansion or contraction of the bushing materials, such as the core, the flange or the locking compound itself would otherwise lead to compression or shear of the locking compound. This means that the bushing disclosed here can be operated in a wider temperature range of the environment and under higher loads as conventional bushings. A further advantage is the potential use of a broader range of suitable locking compounds, e.g. some high-toughness but brittle resins can now be used in place of less durable rubber-like polymers, thereby improving the mechanical properties of the bushing.

For example, the locking compound may prevent axial or radial movement of the core in relation to the other bushing components, for instance in relation to the flange.

The means for mounting the bushing to the electrical appliance include, but are not limited to bolts, rivets, clamps etc. The core can extend through the flange and into the volume of the electrical appliance. The flange may have one or more recesses, channels or grooves on the inside of the cylindrical portion of the flange that, when the core is seated in the flange, forms a joint volume between the flange and the core. The groove can be annular, or it can be interrupted into segments along the circular path. The joint volume may be made up of one or more separate volumes. The groove may include additional features that, when the joint is formed, provide means for improved form locking, such as indentations, slots etc. The flange may be provided with one or more injection channels that allow the injection of a locking compound into the joint volume. The flange may have additional gasket channels that, when a gasket is provided, seal the flange against the core and/or the lower part of the flange against the upper part of the flange.

The flange, for example the upper part of the flange may be configured to receive an insulator that surrounds the core. The insulator may form a closed seal with the flange. However, depending on the application of the bushing such an insulator may also be dispensed with.

According to at least one embodiment, the core has a first section with a diameter that is larger than a diameter of a second section and a diameter of a third section, wherein the first section is arranged between the second section and the third section along an axial direction of the bushing. For example, the first section is that part of the core that has the largest diameter of the core within the flange. In axial direction, the first section is delimited by two transitions where the diameter of the core decreases.

For instance, the flange forms a seat for a first transition between the first section and the second section of the core, wherein the volume of the joint is located at a second transition between the first section and the third section of the core. The second section may be arranged closer to the mounting face of the bushing than the third section or vice versa. The transition between the first section and the second section and/or the transition between the first section and the third section may have a tapered or stepped shape when seen in a cross-sectional view of the bushing. The seat of the flange may be sufficiently form locked such that the degrees of freedom for motion of the core in relation to the flange are limited in one or more directions. For instance, the seat is a conical seat, a spherical surface seat, a step-type seat or the like.

For instance, the compressible material is located on a side of the locking compound that faces away from the seat. Thus, the compressible material may be compressed as the volume of the joint decreases.

According to at least one embodiment, the seat is located at the lower part of the flange and the joint is located at least in part at the upper part of the flange or vice versa. In other words, the seat and the joint are at least in part adjacent to different parts of the flange.

According to at least one embodiment, the compressible material is compressible by at least 10% or by at least 20% or by at least 30% with respect to its unloaded volume. For example, a compression in axial direction by at least 10% of an axial extent of the compressible material may be performed elastically so that the compressible material expands as the volume of the joint increases again.

According to at least one embodiment, the compressible material comprises at least one of: an elastomer, a gel, a compressible filler, expancels. For instance, a foamed polymer or a foamed elastomer material may be used. Using these materials, a high long-term reliability of the joint can be obtained. In principle, any material may be used that provides sufficient compressibility and that is sufficiently mechanically stable during manufacture and operation of the bushing.

According to at least one embodiment, the joint is an annular joint spanning a circumference of the core. Thus, the joint completely surrounds the core in a plane extending parallel to the mounting face of the bushing.

According to at least one embodiment, the locking compound is an Epoxy-type resin, an Epoxy-type adhesive, a Silicone-type adhesive or a Polyurethane-type adhesive. These materials enable a reliable and mechanical stable joint between the core and the flange.

According to at least one embodiment, the bushing is a capacitance graded bushing.

Furthermore, a method for producing an electrical bushing is specified. The method is suited for the production of the bushing described above, for instance. Therefore, features described in connection with the bushing may also apply for the method and vice versa.

According to at least one embodiment, the method comprises the steps of providing a core and a flange with an upper part and a lower part, arranging the upper part and the lower part of the flange around the core, affixing the upper part and the lower part to one another, and forming a joint between the flange and the core. For example, forming the joint comprises the steps of injecting a locking compound filling a second portion of the volume of the joint, wherein a compressible material is provided in a first portion of a volume of the joint. The locking compound is cured while it is in contact with the compressible material. The method steps are performed in the above order, for instance.

For example, the upper part of the flange and the lower part of the flange are connected to each other, for instance mechanically. For example, the core is inserted into one of the upper or lower part of the flange the other part of the flange is lowered over the core before the flange parts are connected to each other. The lower part and the upper part form a seal, for instance.

Typically, the locking compound is injected through one or more injection channels by a technician, but the process can also be automated. The joint volume is filled such that the compressible material and the locking compound together fill the whole volume, for instance. In other words, the locking compound fills the remaining volume of the joint which has not been filled with the compressible material before. However, partial filling can be acceptable. After filling, the injection channel may be sealed, e.g. by plugging.

For example, the compressible material is provided as a prefabricated element that is attached to one of the flange parts, for instance before the flange parts are connected to one another. This facilitates the arrangement of the compressible material within the volume for the joint to be formed.

According to at least one embodiment, the locking compound is injected into the joint after affixing the upper part and the lower part to one another. In other words, the core is affixed to the flange in a state where the flange parts have already been connected to one another.

According to at least one embodiment, the injection is performed with hand-held equipment or mixing equipment, wherein the joint is sealed after injection.

According to at least one embodiment, the locking compound is hardened by heating it to a temperature of at least 50° C. The temperature and time of the curing step typically are dependent on the locking compound and may be selected appropriately. Once the locking compound has hardened, the position of the core relative to the flange is fixed.

Further embodiments and developments of the bushing and the method will become apparent from the example embodiments described below in association with the figures. Features illustrated or described as part of one embodiment can be used on or in conjunction with any other embodiment to yield yet a further embodiment. It is intended that the present disclosure includes such modifications and variations.

BRIEF DRAWING DESCRIPTION

DETAILED DESCRIPTION

In the example embodiments and figures similar or similarly acting constituent parts are provided with the same reference signs. Generally, only the differences with respect to the individual embodiments are described. Unless specified otherwise, the description of a part or aspect in one embodiment applies to a corresponding part or aspect in another embodiment as well.

The elements illustrated in the figures and their size relationships among one another are not necessarily true to scale. Rather, individual elements or layer thicknesses may be represented with an exaggerated size for the sake of better representability and/or for the sake of better understanding.

Figure 1:
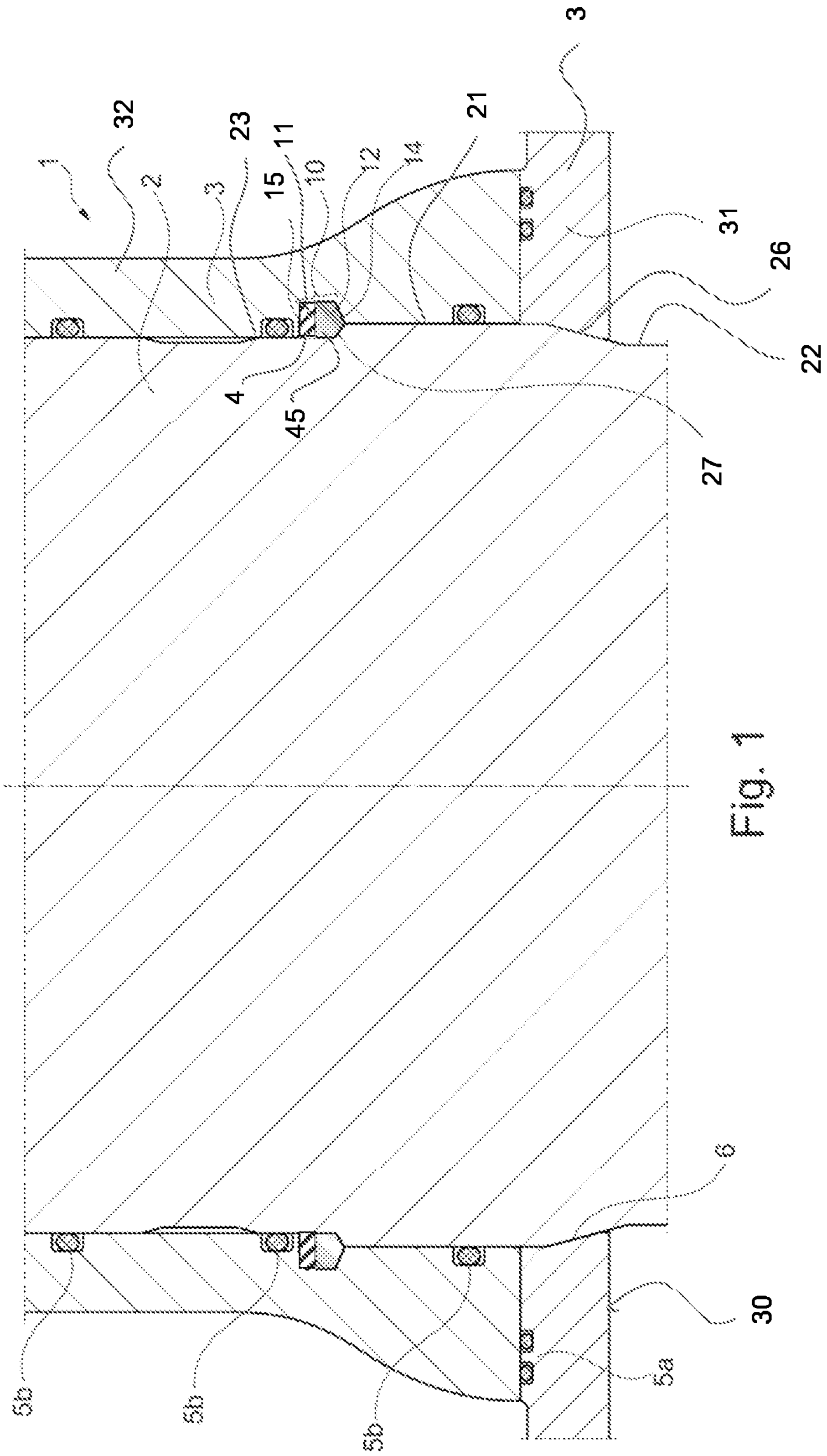
FIG. 1 shows a cutaway view of an example embodiment of a bushing according to some embodiments of the disclosure.

FIG. 1 is a schematic view of a bushing according to an embodiment disclosed herein. The bushing 1 has a core 2 seated in a flange 3. The flange comprises a lower part 31 and an upper part 32. The lower part 31 forms a mounting face 30 for mounting the flange 3 to an appliance.

The flange 3, for example the lower part 31 and the upper part 32 may be made from a metal or a metal alloy, for instance from an aluminum alloy or stainless steel.

The core 2 is a machined resin impregnated paper condenser core, for example. Along an axial direction of the bushing 1, the core comprises a first section 21 arranged between a second section 22 and a third section 23, wherein a diameter of the first section 21 is larger than that of the second section 22 and the third section 23. The lower part 31 of the flange 3 has a tapered section that forms a seat 6 that fits a first transition 26 between the first section 21 and the second section 22 of the core. In the example embodiment shown, the first transition 26 is a tapered section of the core 2, thereby providing means for aligning and fixing the core 2 within the lower part 31 of the flange 3. However, other shapes may be used for the first transition 26 as well.

The upper part 32 of the flange 3 is connected to the lower part 31 of the flange 3, for instance clamped or bolted (not explicitly shown), and sealed via O-ring gaskets 5*a*. The gaskets are arranged in annular axial grooves formed in at least one of the upper part 32 and the lower part 31, for instance in the lower part as shown in FIG. 1. Furthermore, the flange 3, for example the upper part 32, is sealed against the core 2 by three O-ring gaskets 5*b*. These gaskets are located within recesses on the inner surface of the upper part 32 of flange 3. The gaskets 5*a*, 5*b* prevent ingress of contaminants and moisture and prevent the loss of liquid locking compound during injection.

The upper part 32 of flange 3 further has a recess that, when mounted on the core 2, forms the volume of joint 10. The groove forming the joint volume is annular and consists of a first portion 11 and a second portion 12 adjacent to the first portion.

When seen along the axial direction, the volume of the joint 10 is delimited by a flange transition 15 on one side and by the tapered second transition 27 between the first section 21 and the third section 23 of the core 2 on the opposite side. This arrangement provides the core 2 to be secured in position with respect to the flange 3 after locking. In the embodiment shown, the flange transition 15 is embodied as a step forming a flange surface extending perpendicular to the axial direction. However, angles other than 90° may also be used.

In radial direction, the second transition 27 adjoins a tapered section 14 of the flange resulting in a volume of the joint 10 that symmetrically tapers in axial direction towards the mounting face 30.

The first portion 11 is the portion of the joint 10 that is filled with the compressible material 4, and the second portion 12 is filled with the locking compound 45. For instance, the compressible material comprises a foam such as a closed-cell silicone foam and the locking compound is a thermoset epoxy-type resin. However, other materials, for example those mentioned herein may also be used.

The first portion 11 is arranged on that side of the second portion that faces away from the seat 6.

If the core 2 expands more strongly than the flange 3 in axial direction due to different coefficients of thermal expansion, the volume of joint 10 decreases and the compressible material 4 is elastically compressed. In this case, the second transition 27 axially moves in a direction away from the mounting face 30 thereby exerting force on the locking compound 45 which is transferred to the flange transition 15 via the compressible material 4. By means of this configuration, the flange transition 15 provides sufficient securing to make the bushing 1 rigid enough for its functionality, while very small movement is enabled to compensate for differential thermal expansion by means of the compressible material 4. Thus, the mechanical load on the further elements of the bushing 1, for example on the locking compound 45 and the flange 3 is reduced, in particular when compared to the case where the volume of the joint is completely filled with a stiff locking compound.

In the example embodiment of FIG. 1 the seat 6 is located at the lower part 31 of the flange 3 and the joint 10 is located at the upper part 32 of the flange 3. For example, the entire volume of the joint is located in one part of the flange 3, namely in the upper part 32. However, the arrangement may also be inverted so that the seat 6 is provided by the upper part 32 of the flange 3.

Figure 2:
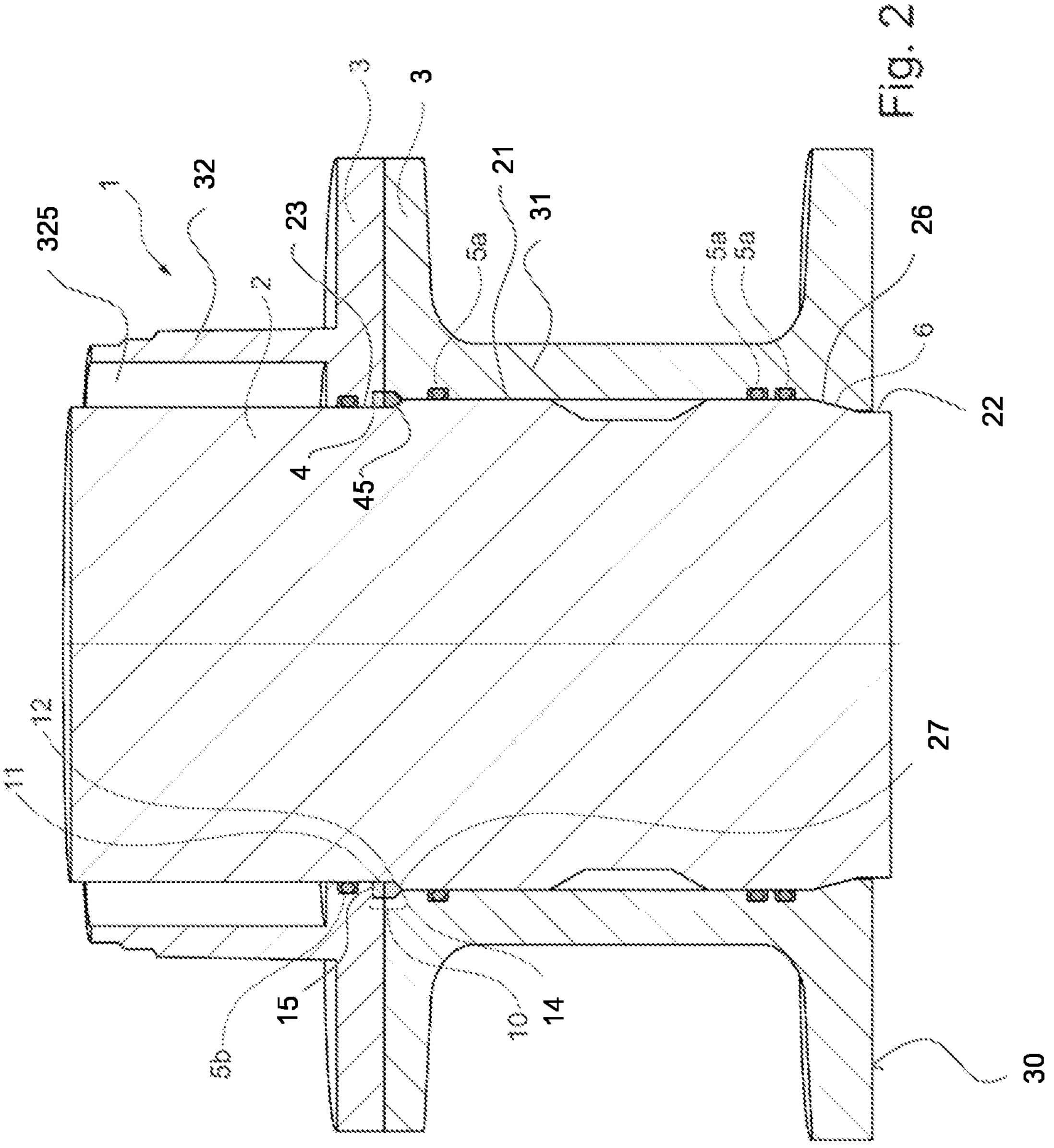
FIG. 2 shows a cutaway view of a further example embodiment of a bushing according to some embodiments of the disclosure.

FIG. 2 is a schematic view of a bushing according to further embodiments disclosed herein.

This further example embodiment essentially corresponds to that of the previously described embodiment.

Unlike in the previously described embodiment, the volume of joint 10 is at least partly formed adjacent to the same part of the flange 3 as the seat 6, namely in the lower part 31 of the flange 31. In other words, the volume is located at an interface between the lower part 31 of the flange 3 and the upper part 32 of the flange. For instance, the first portion 11 of the volume is located adjacent to the upper part 32 and the second portion 12 is adjacent to the lower part 31 of the flange 3. For instance, the volume of the joint 10 is formed by an annular groove within the upper part 32 and a further annular groove within the lower part 31, so that when both parts are mounted around the core 2 each form part of the volume of joint 10.

As in the previous embodiment, the lower part 31 of the flange 3 is sealed against the core by three O-ring gaskets 5*a*. The lower part 31 of the flange is bolted or clamped to the upper part 32 of the flange 3. The upper part 32 of the flange 3 is sealed against the core by an O-ring gasket 5*b*. The gaskets 5*a*, 5*b* are located within recesses on the inner surface of the upper part and the lower part of the flange 3.

The upper part 32 has an annular recess 325 configured to receive an end of an insulator (not shown in the Figure).

As in the previous embodiment, the first section 21 of the core 2 is delimited by a first transition 26 and a second transition 27, wherein the first transition is located at the seat 6 and the second transition is located at the joint 10. The diameter of the core 2 outside of the first section 21 is smaller than in the first section, so that the core can be easily inserted into the lower part 31 of the flange during production of the bushing 1. However, the diameter of the first section 21 does not have to be constant throughout the entire axial extent of the first section as shown in FIG. 2.

Figure 3:
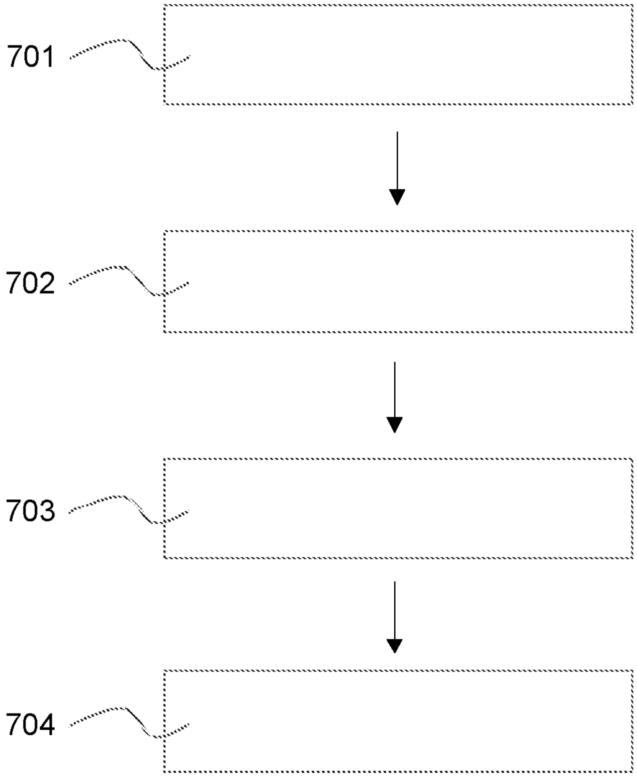
FIG. 3. shows an example embodiment of a method for producing a bushing.

FIG. 3 illustrates a method for producing a bushing 1 which may be configured as described in connection with FIGS. 1 and 2, for instance. For better understanding, the same reference signs are used for the constituents of the bushing as in FIGS. 1 and 2 even though the individual constituents are not drawn in FIG. 3.

In a method step 701 a core 2 and a flange 3 with an upper part 32 and a lower part 31 are provided. The upper part and the lower part are separate elements of the flange configured to be affixed to one another in a subsequent step. The upper part and the lower part may be formed by means of casting, for instance.

In a method step 702, the upper part 32 and the lower part 31 of the flange 3 are arranged around the core 2. For instance, the core 2 is inserted into the lower part 31. This can be performed by lowering the core 2 into the lower part 31 of flange 3 either manually or by a hoist or crane. At this stage, the core 2 may rest on a seat 6 of the lower part 31. After lowering the core 2, the correct seating of the core 2 may be inspected and an adjustment of the position of the core may be performed.

Afterwards, the upper part 32 may be lowered over the core 2 in a similar manner. Alternatively, the seat 6 may also be provided by the upper part 32 of the flange 3. In this case, the core is inserted into the upper part 32 of the flange.

For example, a compressible material 4 is provided in a first portion of a volume of a joint 10 that is to be formed between the core 2 and the flange 3. For instance, the compressible material 4 is a prefabricated annular element that rests in one of the flange parts.

In a method step 703, the upper part 32 and the lower part 31 are fixed to one another, for example mechanically, for instance by clamping or bolting. A seal between the upper part 32 and the lower part 31 may be obtained by one or more gaskets between the two parts, for instance. At this stage, the core 2 is already held within the flange 3.

In a method step 704, a joint 10 between the flange and the core is formed. For this purpose a locking compound 45 is injected into a second portion 12 of the volume of the joint 10. For example, the locking compound 45 fills the entire remaining volume of the joint 10 that has not been filled with the compressive material 4 before. Typically, the locking compound 45 is injected through one or more injection channels by a technician, but the process can also be automated. After the injection, the injection channels are sealed, e.g. by plugging.

After the injection, the locking compound 45 is cured while it is in direct contact with the compressible material 4 until the locking compound has hardened. The curing step can involve heating the bushing 1 or part of the bushing 1, e.g. by utilizing an oven or heating mats. The temperature and time of the curing step typically are dependent on the locking compound, e.g. a thermoset polymer may require a temperature of 80° C. for a period of 4 hours.

Once the locking compound has hardened, the core 2 is aligned within the flange 3 and held in place in radial as well as in axial direction. However, if the volume of the joint 10 decreases during operation of the bushing 1 due to an axial thermal expansion of the core that is larger than that of the flange 3, the compressive material 4 is elastically compressed, thereby mitigating the mechanical stress on the further elements of the bushing 1, for example on the locking compound 45 and the flange 3.

The bushing 1 has been described in connection with a condenser core bushing, but the inventive concept may also be used for any other kind of electrical bushing, such as a solid bushing, also known as a bulk type bushing. The skilled technician is aware that the components of the bushing may be made from a number of available materials and composites, such that the mention of one specific material must not be understood as a limitation. The core 2 of the bushing can be made from any suitable material or compound, such as resin impregnated paper, resin impregnated synthetic or solid epoxy.

The embodiments are not restricted to the example embodiments by the description on the basis of said example embodiments. Rather, the embodiments encompass any new feature and also any combination of features, which in particular comprises any combination of features in the patent claims and any combination of features in the example embodiments, even if this feature or this combination itself is not explicitly specified in the patent claims or example embodiments.

LIST OF REFERENCE SIGNS

1 bushing
10 joint
11 first portion
12 second portion
14 tapered section
15 flange transition
2 core
21 first section
22 second section
23 third section
26 first transition
27 second transition
3 flange
30 mounting face
31 lower part
32 upper part
325 recess
4 compressible material
45 locking compound
5*a*, 5*b* gasket
6 seat
701 step
702 step
703 step
704 step

The invention claimed is:

1. An electrical bushing, comprising:
a flange comprising a lower part and an upper part affixed to one another,
a core surrounded by the flange, and
a volume of a joint between the flange and the core, the volume of the joint delimited by a flange step transition and by a core diameter transition,
wherein:
the flange is affixed to the core by a locking compound disposed in the volume of a joint, and
the volume of the joint further comprises a compressible material, the compressible material being configured to compress or expand in response to a change in the volume of the joint.

2. The electrical bushing according to claim 1, wherein the core has a first section with a diameter that is larger than a diameter of a second section and a diameter of a third section, wherein the first section is arranged between the second section and the third section along an axial direction of the bushing, wherein the flange forms a seat for a first transition between the first section and the second section and wherein the volume of the joint is located at a second transition between the first section and the third section.

3. The electrical bushing according to claim 2, wherein the seat is located at the lower part of the flange and the joint is located at least in part at the upper part of the flange or vice versa.

4. The electrical bushing according to claim 1, wherein the compressible material is compressible by at least 10% with respect to its unloaded volume.

5. The electrical bushing according to claim 1, wherein the compressible material comprises at least one of: an elastomer, a gel, a compressible filler, expancels.

6. The electrical bushing according to claim 1, wherein the joint is an annular joint spanning a circumference of the core.

7. The electrical bushing according to claim 1, wherein the locking compound is an Epoxy-type resin, an Epoxy-type adhesive, a Silicone-type adhesive or a Polyurethane-type adhesive.

8. The electrical bushing according to claim 1, wherein the bushing is a capacitance graded bushing.

9. A method for producing an electrical bushing, the method comprising:
- providing a core and a flange with a lower part and an upper part;
- arranging the upper part and the lower part of the flange around the core;
- affixing the upper part and the lower part to one another;
- forming a joint delimited by a flange step transition and by a core diameter transition between the flange and the core, comprising the steps of:
  - injecting a locking compound filling a second portion of the volume of the joint, wherein a compressible material is provided in a first portion of the volume of the joint, and
  - curing the locking compound while it is in contact with the compressible material.

10. The method according to claim 9, wherein the locking compound is injected into the joint after affixing the upper part and the lower part to one another.

11. The method according to claim 10, wherein the injection is performed with hand-held equipment or mixing equipment, and wherein the joint is sealed after injection.

12. The method according to claim 9, wherein the locking compound is hardened by heating it to a temperature of at least 50° C.

13. The method according to claim 9, wherein a bushing is produced comprising:
- a flange comprising a lower part and an upper part affixed to one another, and
- a core surrounded by the flange,
- wherein:
  - the flange is affixed to the core by a locking compound disposed in a volume of a joint between the flange and the core, and
  - the volume of the joint further comprises a compressible material, the compressible material being configured to compress or expand in response to a change in the volume of the joint.

14. The method according claim 13, wherein the bushing is a capacitance graded bushing.

15. The method according to claim 13, wherein the locking compound is an Epoxy-type resin, an Epoxy-type adhesive, a Silicone-type adhesive or a Polyurethane-type adhesive.

16. The method according to claim 13, wherein the joint is an annular joint spanning a circumference of the core.

17. The method according to claim 13, wherein the compressible material comprises at least one of: an elastomer, a gel, a compressible filler, expancels.

18. The method according to claim 13, wherein the compressible material is compressible by at least 10% with respect to its unloaded volume.

19. An electrical bushing, comprising:
- a flange comprising a lower part and an upper part affixed to one another, and
- a core surrounded by the flange,
- wherein:
  - the flange is affixed to the core by a locking compound disposed in a volume of a joint between the flange and the core, and the volume of the joint further comprises a compressible material, the compressible material being configured to compress or expand in response to a change in the volume of the joint,
  - wherein the core has a first section with a diameter that is larger than a diameter of a second section and a diameter of a third section,
  - wherein the first section is arranged between the second section and the third section along an axial direction of the bushing, wherein the flange forms a seat for a first transition between the first section and the second section and wherein the volume of the joint is delimited by a second transition between the first section and the third section,
  - wherein the seat is located at the lower part of the flange and the joint is located at least in part at the upper part of the flange or vice versa,
  - wherein the compressible material comprises at least one of: an elastomer, a gel, a compressible filler, expancels, and
  - wherein the locking compound is an Epoxy-type resin, an Epoxy-type adhesive, a Silicone-type adhesive or a Polyurethane-type adhesive.

20. The electrical bushing according to claim 19, wherein the bushing is a capacitance graded bushing.

* * * * *